(No Model.)
J. K. P. PINE.
COLLAR.
No. 552,619. Patented Jan. 7, 1896.
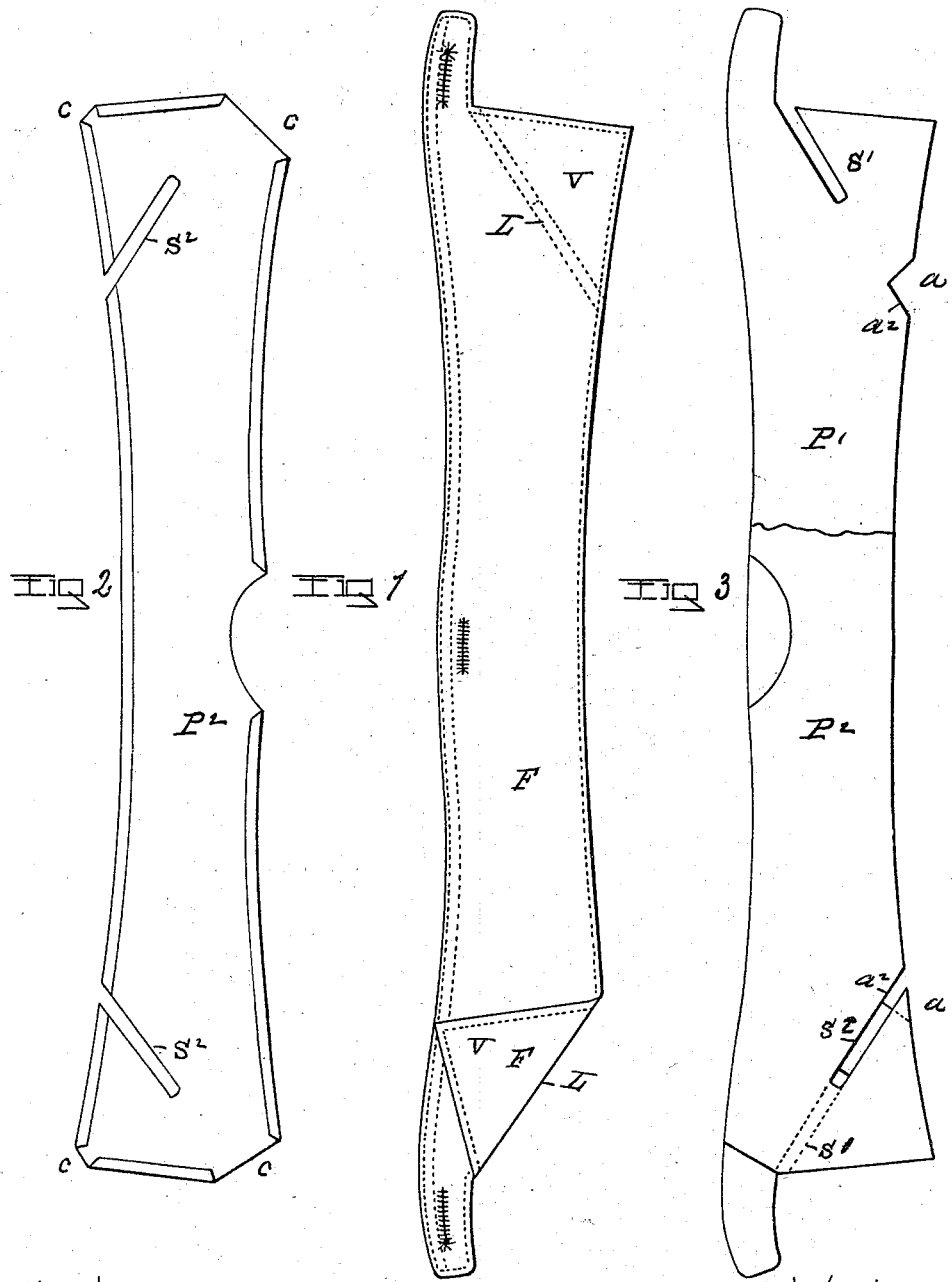
WITNESSES
William A. Swett
Charles B. Brintnall
INVENTOR
James K. P. Pine
by W. E. Hagan atty

UNITED STATES PATENT OFFICE.

JAMES K. P. PINE, OF LANSINGBURG, ASSIGNOR TO THE UNITED SHIRT AND COLLAR COMPANY, OF TROY, NEW YORK.

COLLAR.

SPECIFICATION forming part of Letters Patent No. 552,619, dated January 7, 1896.

Application filed September 18, 1895. Serial No. 562,856. (No model.)

*To all whom it may concern:*

Be it known that I, JAMES K. P. PINE, of the village of Lansingburg, county of Rensselaer, and State of New York, have invented new and useful Improvements in Apparel-Collars, of which the following is a specification.

My invention relates to improvements upon that class of apparel-collars which have pointed ends arranged to be turned down at the front from the body part; and the object and purpose of my invention is to reduce the thickness of the ply on the point-down-fold lines, whereby the fold-line will be well defined and the collars when being ironed will be less likely to break and tear at the fold-line; and this better result I accomplish by cutting from opposite sides of the plies portions of the latter on the fold-line, so as to form a slit or slot extending from the opposite sides of each of the plies, thus reducing the thickness of the material on the point-fold line and leaving the oppositely half-slotted plies free from attachment at the fold-line. To make the fold-line less liable to break at its edges when ironed I cut away at the upper edge and on an angle a part of the ply where the slit or slot formed therein opens out of the ply, so as to reduce the thickness of material thereat, and do the same where fold-line slots or slits open out at the bottom of the ply.

Accompanying this specification to form a part of it there is a plate of drawings containing three figures illustrating my invention, with the same designation of parts by letter-reference used in all of them.

Of the illustrations, Figure 1 is a view of a completed collar containing my improvement, showing one of the points turned down as ironed and the other raised up with the fold-line indicated by a dotted line. Fig. 2 shows one of the plies laid out flat with what is its inner face, when laid over the other ply preparatory to stitching, shown as facing the view. Fig. 3 shows one of the plies laid flat, with part of the ply shown at Fig. 2 laid over it to illustrate the relative positions of the slots made in opposite sides of the blanks to form a fold-line at each end of the collar whereon the points may be turned down.

The several parts of the collar thus illustrated are designated by letter-reference, and the manner of connecting them is described as follows:

The letters F designate the facings which are cut to have the form to be given to the collar, and the letters P' and P² are the plies or thickening material which are between the facings when the collar is completed and connected to the facings at the edges. The ply P' has the same exterior form at its edges as the facings, but the ply P² has no tab end and it is cut away on its corners c. Each of these plies has a slot made therein at each of its ends in which a portion of the ply is removed. These slots in the plies P' and P² are designated at S' and S², and so formed that when the plies P' and P² are laid flat, with the latter ply on top of the other one, these slots will be in line with each of the others, and as each extends part way through one of the plies to meet the slot in the other, they form a fold-line L, whereat there is but one thickness of ply material. On what are the top edges of the plies in the completed collar, the ply P' is cut away on an angle at $a$, with one edge of the angle $a^2$ in line with the end of the slot thereat. As thus formed, the parts are connected in the usual way, by placing the facings between the plies and then border-sewing the parts as laid at what is the top of the collar and at the ends, after which the parts are turned so as to bring the facings to the outside through the unsewed bottom edge, when the latter is infolded and sewed, where the collar is border-stitched at $m$, to complete it. As thus made there is formed at each end of the collar the fold-line L, on which the parts V can be turned down and ironed, as shown at Fig. 1. Thus produced, the ironing of the turned-down points does not tend to break or rupture the material, and when cut away at $a$ the edge of the collar is less liable to break away from its sewed connections.

Having thus described my invention, what I claim, and desire to secure by Letters Patent, is—

1. A turn-down point collar having continuous outer and inner facings, and two continuous intermediate plies, one of the latter having at each end a fold-line-slot formed in its top edge to extend downwardly half way through said ply on an angle, and the other ply having a fold-line-slot made in each end to extend upwardly half way through said ply on an angle, with said fold-line-slots at each end of the plies in parallel alignment, substantially as and for the purposes set forth.

2. A turn-down-point collar having the continuous outer and inner facings F, F, and continuous intermediate plies P², and P', the latter ply having at each end the fold-line slot S', formed therein to extend upwardly on an angle from the bottom edge of the ply half way through the latter, and provided with the angularly cut-away portion $a$, in its top edge at each end; and the ply P², having at each end the fold-line slot S², made to extend downwardly from the top edge of said ply P², half way through the latter with said fold-line slots S', and S², at each of the adjacent ends of the plies in parallel alignment substantially as and for the purposes set forth.

JAMES K. P. PINE.

Witnesses:
N. E. HAGAN,
E. O. HOUSE.